(12) United States Patent  
Cheng et al.

(10) Patent No.: US 8,018,527 B2
(45) Date of Patent: Sep. 13, 2011

(54) CONNECTING STRUCTURE AND DIGITAL CAMERA MODULE EMPLOYING THE SAME

(75) Inventors: Chao-Yuan Cheng, Tu-Cheng (TW); Chao-Kun Tseng, Tu-Cheng (TW); Kai-Po Chan, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 438 days.

(21) Appl. No.: 12/212,744

(22) Filed: Sep. 18, 2008

(65) Prior Publication Data
US 2009/0161005 A1 Jun. 25, 2009

(30) Foreign Application Priority Data
Dec. 21, 2007 (CN) .................. 2007 1 0203344

(51) Int. Cl.
*H04N 5/225* (2006.01)

(52) U.S. Cl. ......... 348/373; 348/374; 348/375; 348/376
(58) Field of Classification Search .................. None
See application file for complete search history.

(56) References Cited

U.S. PATENT DOCUMENTS

| 7,505,072 B2 * | 3/2009 | Saitoh | 348/333.01 |
| 2005/0179803 A1 * | 8/2005 | Sawai | 348/335 |

* cited by examiner

*Primary Examiner* — Lin Ye
*Assistant Examiner* — John H Morehead, III
(74) *Attorney, Agent, or Firm* — Altis Law Group, Inc.

(57) ABSTRACT

A digital camera module (100) includes an image capturing apparatus (30) and a connecting structure (40). The image capturing apparatus includes an image sensing module (32) and a flashing module (34). The connecting structure includes a cover (42) configured for receiving the image sensing module therein, and a holding member (44) connected to the cover and configured for fixing the flashing module thereon at a height substantially equal to that of the image sensing module.

16 Claims, 3 Drawing Sheets

CONNECTING STRUCTURE AND DIGITAL CAMERA MODULE EMPLOYING THE SAME

BACKGROUND OF THE INVENTION

1. Field of the Invention

The present invention generally relates to a connecting structure, and a digital camera module employing the connecting structure.

2. Description of Related Art

Nowadays, portable electronic devices, such as mobile phones, laptops and personal digital assistants (PDAs) are widely used. Many portable electronic devices have digital camera modules installed therein, thus the portable electronic devices can be used to capture images.

In assembly, the digital camera modules are usually connected to circuit boards of portable electronic devices. Referring to FIG. 3, a typical digital camera module 10 used in a portable electronic device (not shown) includes a lens module 12 and a flashing module 14. The lens module 12 has a first connecting end 122 fixed on a circuit board 20 of the portable electronic device and electronically connected thereto, and an opposite imaging end 124 extending from the circuit board 20 to capture images. The flashing module 14 has a second connecting end 142 fixed adjacent to the lens module 12 on the circuit board 20 and electronically connected thereto, and an opposite flashing end 144 extending from the circuit board 20 to provide light for shooting.

Because the lens module 12 is usually much larger than the flashing module 14, when the digital camera module 10 is connected to the circuit board 20, the height of the lens module 12 is larger than that of the flashing module 14. Thus, despite the flashing module 14 being positioned adjacent to the lens module 12, there is a long distance between the flashing end 144 and the imaging end 124. Therefore, it is difficult to provide enough light to the lens module 12 with the flashing module 14. The lens module 12 without enough illumination cannot capture images having high quality.

Therefore, a new connecting structure and a digital camera module employing the same are desired in order to overcome the above-described shortcomings.

BRIEF DESCRIPTION OF THE DRAWINGS

Many aspects of the connecting structure and digital camera module employing the same can be better understood with reference to the following drawings. The components in the drawings are not necessarily drawn to scale, the emphasis instead being placed upon clearly illustrating the principles of the connecting structure and digital camera module employing the same. Moreover, in the drawings, like reference numerals designate corresponding parts throughout the several views.

DETAILED DESCRIPTION OF THE EMBODIMENTS

Figure 1:
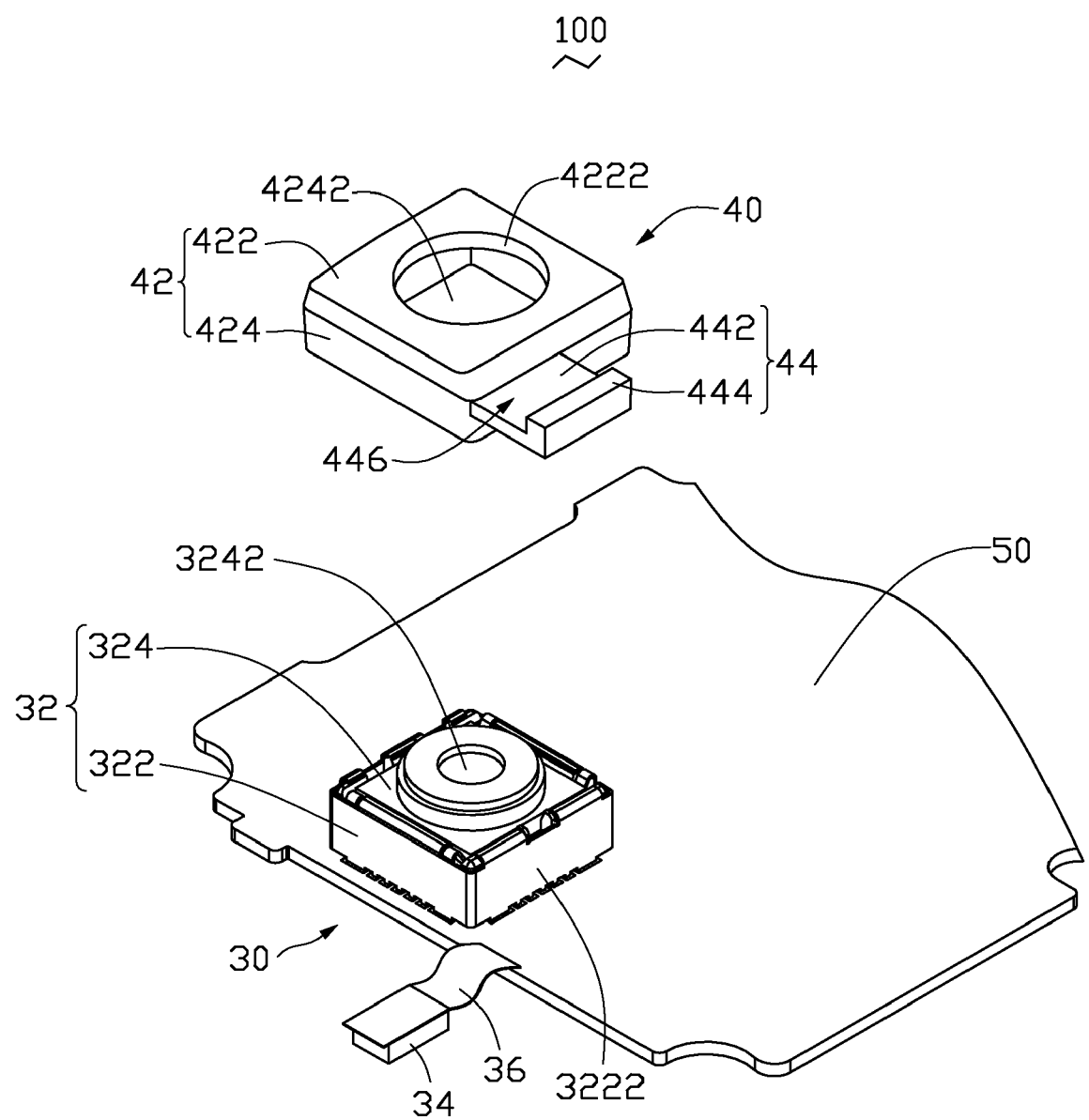
FIG. 1 is a disassembled view of a digital camera module according to an exemplary embodiment.
Figure 2:
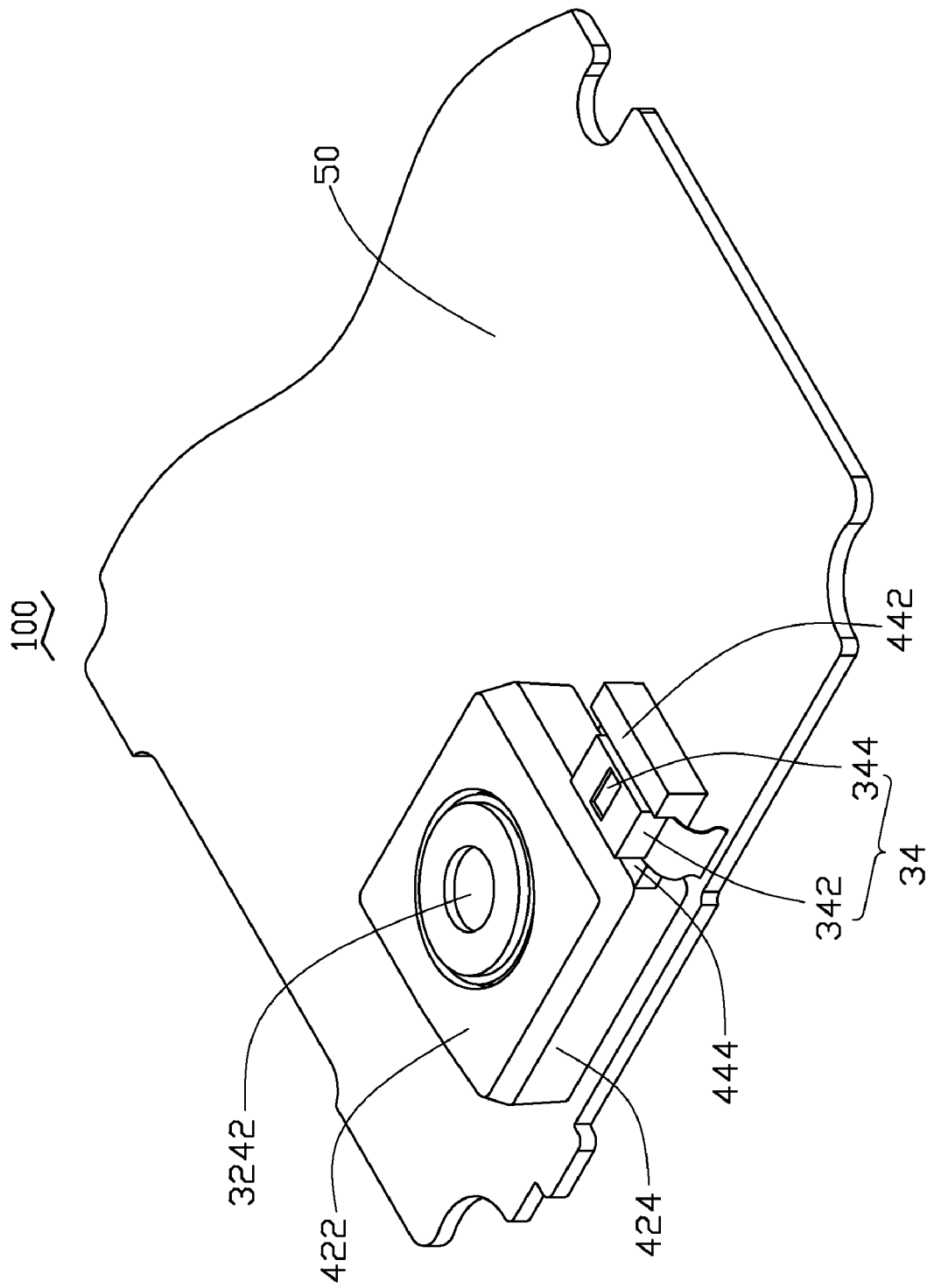
FIG. 2 is an assembled view of the digital camera module shown in FIG. 1.
Figure 3:
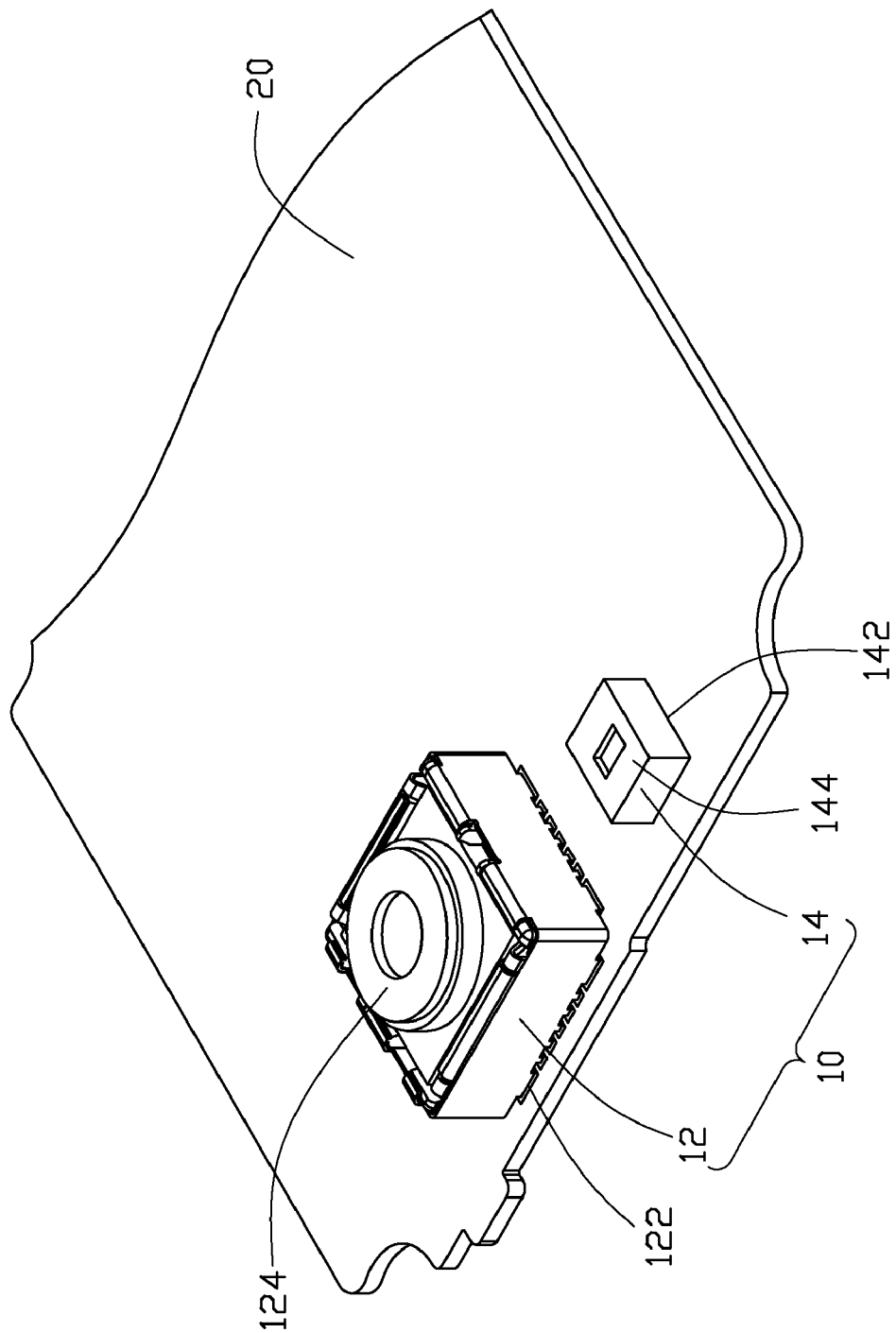
FIG. 3 is an assembled view of a typical digital camera module.

Referring to FIGS. 1-2, a digital camera module 100 according to an exemplary embodiment is provided. The digital camera module 100 includes an image capturing apparatus 30, a connecting structure 40 and a circuit board 50, wherein the image capturing apparatus 30 and the connecting structure 40 are assembled together and fixed on the circuit board 50.

The image capturing apparatus 30 includes an image sensing module 32, a flashing module 34 and a flexible printed circuit (FPC) 36. The image sensing module 32 includes a rectangular frame 322 formed by four sidewalls 3222 and a lens module 324 received in the frame 322. Each sidewall 3222 has a side fixed on the circuit board 50, then the frame 322 is mounted on the circuit board 50. The image sensing module 32 is held on the circuit board 50 by the frame 322 and can be electronically connected to the circuit board 50. The lens module 324 includes at least one lens 3242 mounted at an end thereof and exposed out of the frame 322 for capturing images. The flashing module 34 includes a housing 342 and a flashing lamp 344 mounted in a central portion of the housing 342. The FPC 36 has one end connected to the circuit board 50 and another end connected to the flashing module 34, thus the flashing module 34 can be electronically connected to the circuit board 50 via the FPC 36.

The connecting structure 40 includes a cover 42 and a holding member 44 connected to the cover 42. The cover 42 is generally a hollow cuboid including a top wall 422 and four sidewalls 424 perpendicularly connected to the top wall 422. The top wall 422 defines a capturing aperture 4222 corresponding to the lens 3242 in a central portion thereof. The four sidewalls 424 and the top wall 422 cooperate to form a cavity 4242 configured for receiving the image capturing apparatus 30 therein.

The holding member 44 includes a main board 442 and a rectangular protrusion 444 formed on an end of the main board 442. The main board 442 has one side perpendicularly fixed on a predetermined position of one sidewall 424, so that the holding member 44 has a height which is approximately equal to that of an image sensing module 32 received in the cavity 4242. Another side of the main board 442 extends approximately parallel to the one sidewall 424 to form the protrusion 444. A distance between the sidewall 424 and the protrusion 444 is configured to be approximately equal to a width of the flashing module 34. Thus, the sidewall 424, the main board 442 and the protrusion 444 cooperate to form a latching groove 446 configured for receiving the flashing module 34 between the sidewall 424 and the protrusion 444.

In assembly, the image sensing module 32 and the flashing module 34 are electronically connected to the circuit board 50. The image capturing apparatus 30 is received in the cavity 4242 of the connecting structure 40, and the lens 3242 is exposed from the capturing aperture 4242 for capturing images. The cover 42 is then fixed on the circuit board 50. The flashing module 34 is engaged with the latching groove 446 and fixed onto the main board 442. Since the holding member 44 is positioned at a predetermined height approximately equal to that of the image sensing module 32, a height of the flashing module 34 fixed on the holding member 44 is also approximately equal to that of the image sensing module 32. Therefore, the flashing module 34 is positioned closer to the image sensing module 32 than in the prior art. The circuit board 50 can be integrated with a circuit of a portable electronic device (not labeled), such as a mobile phone. The gap (not labeled) between the main board 42 and the circuit board 50 can also be used to receive other components of the portable electronic device.

In use, the image capturing module 32 is used to shoot and the flashing module 34 is used to provide illumination. Since the image sensing module 32 and the flashing module 34 are positioned in approximately equal heights by the connecting structure 40, the flashing lamp 344 can be positioned to be close enough to the image sensing module 32 to provide adequate light for image capturing. In this way, the digital camera module 100 can capture high quality images. Additionally, the cover 42 can prevent contamination of the image capturing module 32 by dust and vapor.

The cover 42 and the holding member 44 can also be configured to be in other shapes, so long as the flashing module 34 is positioned close enough to the image capturing module 32 by the connecting structure 40.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A connecting structure configured for connecting a digital camera module which includes an image sensing module and a flashing module, comprising:
    a cover configured for receiving the image sensing module therein; and
    a holding member connected to the cover and configured for fixing the flashing module thereon, the holding member including a main board connected to the cover and a protrusion formed on the main board, thereby forming a latching groove between the cover and the protrusion;
    wherein the flashing module is fixed on the main board and received in the latching groove; wherein the cover includes a top wall and a plurality of side walls substantially perpendicularly connected to the top wall; one side of the main board is substantially perpendicularly fixed on one of the side walls; and the protrusion is formed on another side of the main board, such that the latching groove is formed between the side wall of the cover that is connected.

2. The connecting structure as claimed in claim 1, wherein the cover includes a top board defining a capturing aperture therein, the image sensing module being exposed from the capturing aperture.

3. The connecting structure as claimed in claim 2, wherein the cover includes a plurality of sidewalls, the holding member being connected to one of the sidewalls and has a height substantially equal to that of the image sensing module.

4. The connecting structure as claimed in claim 2, wherein the cover includes a plurality of sidewalls, the holding member being connected to one of the sidewalls so that the flashing module fixed thereon has a height equal to that of the image sensing module.

5. A digital camera module, comprising:
    an image capturing apparatus including an image sensing module and a flashing module; and
    a connecting structure including a cover configured for receiving the image sensing module therein, and a holding member connected to the cover and configured for fixing the flashing module thereon, the holding member including a main board connected to the cover and a protrusion formed on the main board, thereby forming a latching groove between the cover and the protrusion; wherein the flashing module is fixed on the main board and received in the latching groove;
    wherein the cover includes a top wall and a plurality of side walls substantially perpendicularly connected to the top wall; one side of the main board is substantially perpendicularly fixed on one of the side walls; and the protrusion is formed on another side of the main board, such that the latching groove is formed between the side wall of the cover that is connected to the main board and the protrusion.

6. The digital camera module as claimed in claim 5, further comprising a circuit board configured for mounting the image capturing apparatus and the connecting structure thereon, the image capturing apparatus being electronically connected to the circuit board.

7. The digital camera module as claimed in claim 6, wherein the image capturing apparatus includes a flexible printed circuit (FPC) which has one end connected to the circuit board and another end connected to the flashing module.

8. The digital camera module as claimed in claim 5, wherein the image sensing module includes a at least one lens mounted at an end thereof and the cover defines a capturing aperture corresponding to the lens therein, the lens being exposed from the capturing aperture.

9. The digital camera module as claimed in claim 5, wherein the holding member has a height substantially equal to that of the image sensing module.

10. The digital camera module as claimed in claim 5, wherein the flashing module has a height substantially equal to that of the image sensing module.

11. The connecting structure as claimed in claim 1, wherein a width of the latching groove is substantially equal to a width of the flashing module.

12. The digital camera module as claimed in claim 5, wherein a width of the latching groove is substantially equal to a width of the flashing module.

13. A digital camera module, comprising:
    an image capturing apparatus including an image sensing module and a flashing module; and
    a connecting structure including a cover and a holding member, the holding member including a main board connected to the cover and a protrusion formed on the main board, thereby forming a latching groove between the cover and the protrusion; wherein the image sensing module is received in the cover and the flashing module is positioned outside of the cover; the flashing module mounted on the main board and received in the latching groove, and a height of the flashing module being substantially equal to a height of the image sensing module;
    wherein the cover includes a top wall and a plurality of side walls substantially perpendicularly connected to the top wall; one side of the main board is substantially perpendicularly fixed on one of the side walls; and the protrusion is formed on another side of the main board, such that the latching groove is formed between the side wall of the cover that is connected to the main board and the protrusion.

14. The digital camera module as claimed in claim 13, wherein a width of the latching groove is substantially equal to a width of the flashing module.

15. The digital camera module as claimed in claim 13, further comprising a circuit board; both the image sensing module and the flashing module electrically connected to the circuit board, and both the image sensing module and the cover mounted on the circuit board.

16. The digital camera module as claimed in claim 15, wherein the image capturing apparatus further includes a flexible printed circuit (FPC); the FPC positioned outside of the cover, and the flashing module electrically connected to the circuit board through the FPC.

* * * * *